United States Patent [19]
Dube

[11] 3,924,058
[45] Dec. 2, 1975

[54] DEIONIZING DEVICE FOR AERIAL ELECTRIC LINES

[76] Inventor: Rosario Dube, 85 Lac Dube Ste. Ursule, cte, Maskinonge, Quebec, Canada, J0K3M0

[22] Filed: June 26, 1974

[21] Appl. No.: 483,448

[52] U.S. Cl. .............................. 174/140 R; 313/325
[51] Int. Cl.² .......................................... H01B 17/42
[58] Field of Search ............ 317/72; 174/2, 4, 6, 78, 174/127, 140 R, 144, 73 R; 313/325

[56] References Cited
UNITED STATES PATENTS
2,629,765  2/1953  Cougnard ...................... 174/140 R
2,914,602  11/1959 Cougnard ...................... 174/140 R Primary Examiner—J. D. Miller
Assistant Examiner—Harry E. Moose, Jr.

[57] ABSTRACT

An improved deionizing device for installation on power lines. The device has at least one, first electrode member detachably connected to the power line. A second electrode member is provided, spaced from the first member, and connected to the ground. The second member is mounted on a pole carrying the power line. The first electrode member has a disc-like shape to provide strength and a gap extends inwardly from the edge of the disc. The power line sits in the gap and the gap opens upwardly when the member is mounted on the power line.

7 Claims, 4 Drawing Figures

DEIONIZING DEVICE FOR AERIAL ELECTRIC LINES

This invention is directed toward improvements in deionizing devices for electrical power lines.

Deionizing devices for installation on power lines are known as shown in Canadian Pat. Nos. 462,596 and 622,583. The known deionizing devices operate effectively to neutralize ionized clouds formed during electrical storms, which clouds can travel along power lines. If not neutralized, the clouds can lead to arcing and possible equipment damage.

The known devices are, however, quite expensive to build, and difficult, and thus time-consuming to install or replace. Some versions also require power to be interrupted during installation or repair which is inconvenient. In addition, the known devices are accessible to animals such as squirrels. These animals could disrupt service if they gain access to the devices.

It is the purpose of the present invention to provide improvements in deionizing devices which minimize or avoid the above disadvantages. The invention provides devices which are simpler to construct and thus less expensive than known devices and which also are easier and therefore quicker to install. It is also a purpose of the present invention to provide improved deionizing devices which provide some protection against a disruption in service by animals.

The invention is particularly directed toward a deionizing device having at least one first plate-like, electrode member and means on said first member for detachably mounting the member on an electrical power line with the member being substantially perpendicular to the line when mounted thereon. The mounting means is located on the member in a position such that when the member is mounted on the electrical line, a substantial portion of the area of the member is on one side of a plane containing the electrical line. A second, plate-like, electrode member is adapted to be mounted in parallel spaced relation to the substantial portion of the area of the first member. Means are provided for grounding the second electrode member.

The electrode member of the deionizing device preferably has a disc-like shape with a gap extending inwardly from the edge of the disc in which gap the power line is inserted.

The first electrode member cooperates with a second electrode member parallel to, but spaced therefrom and which second member is connected to ground.

A protective shield is preferably mounted on the second member, the shield having sloping edges.

The invention will now be described in detail having reference to the accompanying drawings in which.

Figure 1:
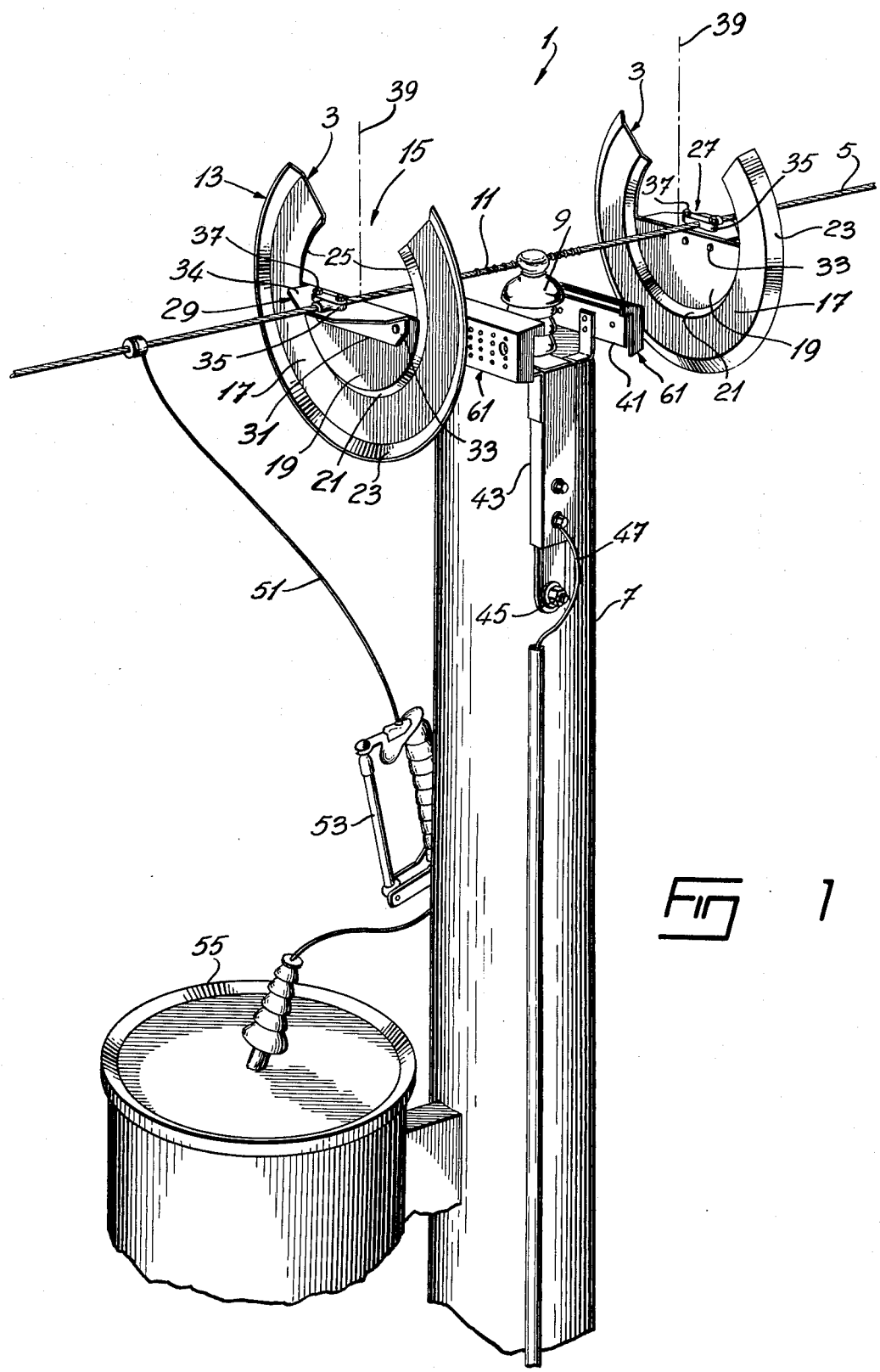
FIG. 1 is a perspective view of the deionizing device mounted on the top of a pole.

The deionizing device 1 of the present invention, as shown in FIG. 1, has at least one, and preferably a pair, of deionizing electrode plate members 3 adapted to be detachable mounted on an electrical transmission line 5. The power line 5 usually extends horizontally and is mounted on the top of a pole 7. The line 5 is mounted on the pole 7 via an insulator 9 and a connecting wire 11. One plate member 3 is located on one side of the insulator and the other plate member is located on the other side.

Each plate member 3 is made from a spun, aluminum circular disc 13, a portion of which is cut away to form a gap 15 extending inwardly from the edge of the disc. The disc 13 has a raised annular rim 17 and a dished, circular center 19. The center 19 is connected to rim 17 by an annular angled wall 21 and an angled, annular flange 23 is connected to the outer edge of rim 17. This construction, with angled wall 21 and flange 23, provides a relatively rigid structure. The gap 15 is formed by cutting away an annular segment from rim 17, the segment including a portion of wall 21 and flange 23; and also cutting away a circular segment from center 19. A large enough circular segment is cut away so that a portion of the rim 17 forms a pair of arms 25 extending symmetrically past center 19 toward each other. The gap 15 facilitates mounting of the plates 3 on the line 5. The gap 15 is sized so as to reduce the weight of plates 3 as much as possible while still retaining sufficient material to intercept ionized clouds travelling along the line 5 as will be described. The gaps 15 also minimize the possibility of the ionized clouds passing between the plates 3.

Each plate 3 is provided with mounting means 27 for mounting the plate 3 on the line 5 so that the plate 3 extends substantially perpendicular to the line 5. The mounting means 27 preferably comprises a right angled bracket 29 having one flange 31 attached by bolts 33 to center 19. The other flange 34 carries a line-attaching bracket 35 connected to flange 34 by bolts 37. The flange 34 extends substantially perpendicular to a line 39 bisecting gap 15.

Each plate 3 is mounted on power line 5 so that gap 15 opens upwardly. Power line 5 rests on flange 34 and center line 39, bisecting gap 15, extends vertically. It is thus seen that a major portion of the plate 3 lies below a horizontal plane containing flange 34 and power line 5. The plate 3 is mounted on line 5 by placing bracket 35 over line 5 as it rests on flange 34 and attaching bracket 35 to flange 34 by bolts 37.

The size of each electrode plate 3 varies depending on the voltage of line 5 but, by way of example, for a power line carrying 36,000 volts, plate 3 would be approximately 15 inches in diameter, and arms 25 would have a width of approximately 3 inches and a length of approximately four inches.

Each plate electrode 3 cooperates with an electrode 41 mounted on a bracket 43 which is attached to pole 7 by bolts 45. Electrode 41 comprises a flat plate, extending parallel to plate 3, and it is connected directly to ground by a line 47. Electrode 41 is spaced approximately six inches from plate 3 for a 33,000 volt line.

In operation, when an ionized cloud travels along line 5, it looks for the easiest path to ground. Without deionizing device 1, the cloud could pass down a line 51, through a circuit breaker 53 to transformer 55. Line current could then arc to transformer 55 damaging it. With deionizing device 1 on line 5, the cloud passes along line 5 to be intercepted by plate 3. A major portion of the cloud travels beneath line 5 and thus is intercepted by plate 3, a major portion of which is below line 5. The cloud is deionized between the capacitor formed between plates 3, 41 and discharges to ground through line 47. The path to ground through line 47 provides much less resistance than the path through line 51.

It is seen that the plates 3, and plate electrodes 41, are easily mounted on line 5 and pole 7 is a very short time, and without having to interrupt the current in the line.

Figure 3:
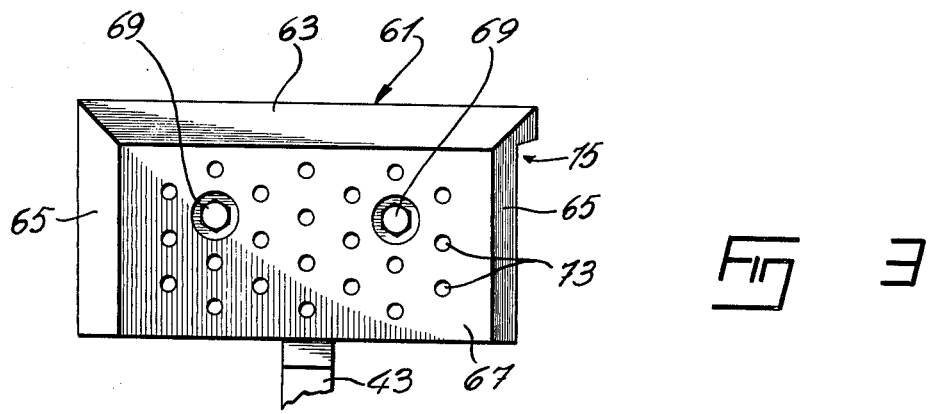
FIG. 3 is a front elevation view of a protective shield for a portion of the deionizing device.
Figure 4:
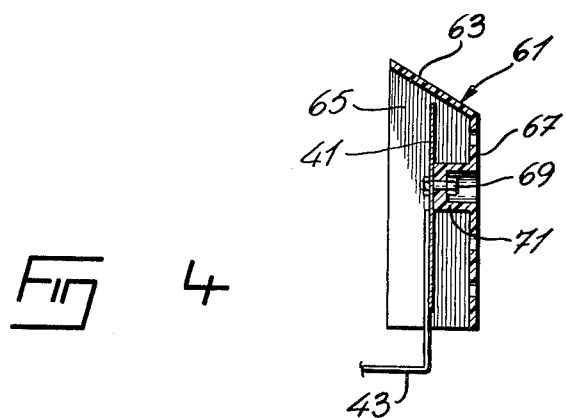
FIG. 4 is a cross-sectional view showing the manner in which the cover is mounted.

The plates 41 are preferably provided with plastic shields 61. The shields 61 are provided to prevent birds or squirrels from sitting on the plates 41 which, if it happened, could lead to arcing. The shields 61, as shown in FIGS. 3 and 4 have angled top and side flanges 63, 65 extending out from a front wall 67. Bolts 69, passing through sockets 71 in the front wall 67, connect the shields to the plates 41 with the front wall 67 parallel to but spaced from plates 41. The flanges 63, 65 extend about plates 41. Front wall 67 can have perforations 73 to assist discharge and one flange 65 can have a cut-out 75 to assist in mounting the shields on the plates.

Figure 2:
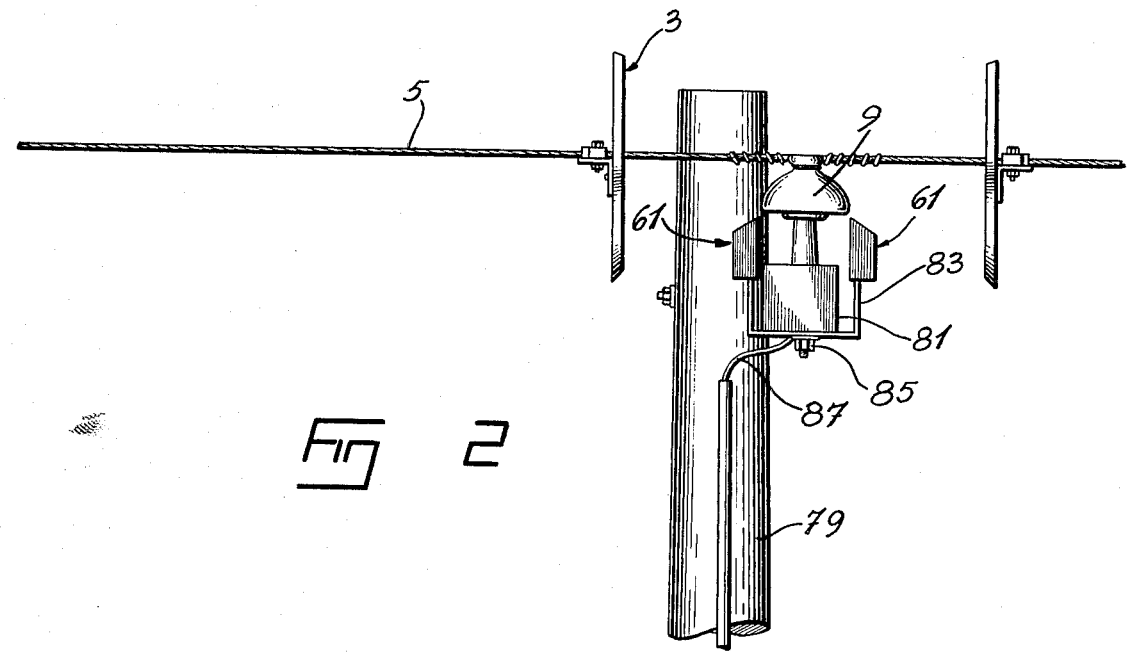
FIG. 2 is an elevation view of the deionizing device mounted on the cross-arm of a pole.

While FIG. 1 illustrates the use of the deionizing device 1 on the top of a pole, the deionizing device 1 can also be used on pole 79 having a cross-arm 81 as shown in FIG. 2. In this embodiment, the U-shaped bracket 83, carrying plates 41, is attached to the underside of the cross-arm 81 by a bolt 85 and ground line 87 is connected to bolt 85. The plates 3, as before, connect directly to the power line 5.

The present invention shown a single line system. However, a deionizing device can be installed on each line of a three-line power system if desired.

I claim:
1. A deionizing device comprising:
 - at least one first, plate-like, electrode member,
 - means on said first member for detachably mounting said member on an electrical power line with said member being substantially perpendicular to the line when mounted thereon, the mounting means being located on the member in a position such that when the member is mounted on the electrical line, a substantial portion of the area of the member is on one side of a plane containing the electrical line,
 - a second, plate-like, electrode member adapted to be mounted in parallel spaced relation to the substantial portion of the area of the first member, and means for grounding the second electrode member.

2. A deionizing device as claimed in claim 1 wherein the first electrode member has a general disc shape with a gap extending inwardly from the edge of the disc.

3. A deionizing device as claimed in claim 2 wherein the disc has a raised rim portion, an angled annular flange portion and angled annular wall portion, the flange portion and the wall portion imparting strength to the disc.

4. A deionizing device as claimed in claim 1, wherein the mounting means on the first member comprises a first bracket attached to the member, and a second line-attaching bracket detachably connected by bolts to the first bracket for clamping the line between the brackets.

5. A deionizing device as claimed in claim 1 including a protective shield mounted on the second electrode member, the shield having sloping edges.

6. A deionizing device for installation on a power line supported by a pole, the device comprising a first pair of disc-like, electrode members detachably connected to the power line, one on each side of the pole; each first electrode member having an upwardly opening gap with the line placed within the gap and the line extending perpendicular to the members; and a second pair of plate-like electrode members mounted on the pole and connected to ground, one of each second pair of members cooperating in spaced parallel relation with one of the first pair of members.

7. A deionizing device according to claim 1, comprising two of said first members independently disposed on said line and two of said second members.

* * * * *